United States Patent
Lu et al.

(10) Patent No.: US 12,543,035 B2
(45) Date of Patent: Feb. 3, 2026

(54) PROVIDING INFORMATION REGARDING SUPPORTED FEATURES OF A NETWORK FUNCTION CONSUMER BY A NETWORK FUNCTION REPOSITORY OR DIRECTLY

(71) Applicant: Telefonaktiebolaget LM Ericsson (publ), Stockholm (SE)

(72) Inventors: Yunjie Lu, Shanghai (CN); Yong Yang, Kållered (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 238 days.

(21) Appl. No.: 18/286,548

(22) PCT Filed: Apr. 12, 2022

(86) PCT No.: PCT/EP2022/059678
§ 371 (c)(1),
(2) Date: Oct. 11, 2023

(87) PCT Pub. No.: WO2022/218947
PCT Pub. Date: Oct. 20, 2022

(65) Prior Publication Data
US 2024/0196194 A1    Jun. 13, 2024

(30) Foreign Application Priority Data
Apr. 13, 2021   (WO) ................ PCT/CN2021/086955

(51) Int. Cl.
*H04L 41/12* (2022.01)
*H04L 41/40* (2022.01)
(Continued)

(52) U.S. Cl.
CPC ............... *H04W 8/20* (2013.01); *H04L 41/12* (2013.01); *H04L 41/40* (2022.05);
(Continued)

(58) Field of Classification Search
CPC ..... H04L 41/12; H04L 41/40; H04L 41/5022; H04L 41/5058; H04W 8/00
See application file for complete search history.

(56) References Cited

U.S. PATENT DOCUMENTS 11,589,298 B2 * 2/2023 Sapra ................. H04W 48/16
2020/0028920 A1 * 1/2020 Livanos ................ H04W 8/26
(Continued)

OTHER PUBLICATIONS

3GPP TS 29.571 V17.1.0 (Mar. 2021) (129 pages).
(Continued)

*Primary Examiner* — Un C Cho
(74) *Attorney, Agent, or Firm* — Rothwell, Figg, Ernst & Manbeck, P.C.

(57) ABSTRACT

TS 29.500, usually the feature negotiation is done when the subscription is created by the NF consumer. P: For default notification subscriptions, the NF consumer registers the default subscriptions in NRF and NF producer discover and directly send the notification towards the callback URI without subscription creation procedure. S: NF to register the supported features in default subscription. The NF producer can get aware the supported feature of the NF consumer and adjust the notification accordingly. TS 29.510, API Version Control and feature negotiation between NF producer and NF consumer. In 5GC, a NF Producer may subscribe to another NF producer on behalf of the NF consumer with directly reporting. P: No way for the NF consumer to indicate the supported API version and features of the second NF producer which will directly report to the NF consumer. S: New header to allow the NF consumer to indicate the supported API version and features.

26 Claims, 9 Drawing Sheets

(51) Int. Cl.
   *H04L 41/50*   (2022.01)
   *H04L 41/5022*   (2022.01)
   *H04W 4/12*   (2009.01)
   *H04W 8/20*   (2009.01)

(52) U.S. Cl.
   CPC ...... *H04L 41/5022* (2013.01); *H04L 41/5058* (2013.01); *H04W 4/12* (2013.01)

(56) References Cited

U.S. PATENT DOCUMENTS

2022/0361085 A1* 11/2022 Rajput ................ H04W 60/00
2024/0064212 A1* 2/2024 Rodrigo ............. H04L 67/1012

OTHER PUBLICATIONS

3GPP TS 29.518 V17.1.0 (Mar. 2021) (313 pages).
Orange, "Communication options information", 3GPP TSG-CT WG4 Meeting #103-e, C4-212067, E-Meeting, Apr. 14-24, 2021 (14 pages).
Japanese Office Action issued in International Application No. 2023-561398 dated Oct. 15, 2023 (p. 4).
International Search Report and Written Opinion issued in International Application No. PCT/EP2022/059678 Oct. 14, 2022 (19 pages).
Ericsson, "Notification Binding for Default Subscription", 3GPP TSG-CT WG4 Meeting #99e, C4-204447 was C4-204262, E-Meeting, Aug. 18-28, 2020 (4 pages).
3GPP TS 29.510 V17.1.0 (Mar. 2021), 3rd Generation Partnership Project; Technical Specification Group Core Network and Terminals; 5G System; Network Function Repository Services; Stage 3 (Release 17), Mar. 2021 (243 pages).
Ericsson, "Supported Features for Default Notification Subscriptions", 3GPP TSG-CT WG4 Meeting #104-e, C4-213409 was C4-213241, E-Meeting, May 19-28, 2021 (4 pages).
3GPP TS 29.500 V17.2.0 (Mar. 2021), 3rd Generation Partnership Project; Technical Specification Group Core Network and Terminals; 5G System; Technical Realization of Service Based Architecture; Stage 3 (Release 17), Mar. 2021 (100 pages).
3GPP TS 29.501 V16.0.0 (Jun. 2019), 3rd Generation Partnership Project; Technical Specification Group Core Network and Terminals; 5G System; Principles and Guidelines for Services Definition; Stage 3 (Release 16), Jun. 2019 (69 pages).
ETSI TS 129 510 V16.6.0 (Jan. 2021), Technical Specification, 5G; 5G System; Network function repository services; Stage 3 (3GPP TS 29.510 version 16.6.0 Release 16), Jan. 2021 (227 pages).
ETSI TS 129 510 V16.7.0 (Apr. 2021), Technical Specification, 5G; 5G System; Network function repository services; Stage 3 (3GPP TS 29.510 version 16.7.0 Release 16), (Apr. 2021) (231 pages).
ETSI TS 129 518 V16.6.0 (Jan. 2021), Technical Specification, 5G; 5G System; Access and Mobility Management Services; Stage 3 (3GPP TS 29.518 version 16.6.0 Release 16), Jan. 2021 (302 pages).

* cited by examiner

PROVIDING INFORMATION REGARDING SUPPORTED FEATURES OF A NETWORK FUNCTION CONSUMER BY A NETWORK FUNCTION REPOSITORY OR DIRECTLY

CROSS REFERENCE TO RELATED APPLICATIONS

This application is a 35 U.S.C. § 371 National Stage of International Patent Application No. PCT/EP2022/059678, filed 2022 Apr. 12, which claims priority to International Patent Application No. PCT/CN2021/086955, filed 2021 Apr. 13, which is incorporated by this reference.

TECHNICAL FIELD

This disclosure relates to a service consumer providing information regarding features of a service provided by a service producer that are supported by the service consumer.

BACKGROUND

The 3rd Generation Partnership Project (3GPP) 5G application programming interface (API) provides a mechanism to allow a network function (NF) producer (a.k.a., "service provider") and a NF consumer (a.k.a., "service consumer") to negotiate optional features (e.g., backward compatible changes which may affect information exchanged via API operations). 3GPP TS 29.500 V17.2.0 ("TS 39.500") describes, among many other things, extensibility mechanisms supported in the Service-Based Architecture in 3GPP 5G core (5GC). These extensibility mechanisms include "feature negotiation," which is described in TS 29.500 in section 6.6.2. A network function may register Default Notification Subscription in NF profile, indicating which event type(s) are interested by the NF as a NF consumer, at NF profile level or service level. When an NF producer selects a NF consumer to receive a notification message for a default notification, the NF producer will use the Nnrf_NF-Discovery service API using GET, as specified in 3GPP TS 29.510 V16.7.0 ("TS 29.510"), which states, "this operation retrieves a list of NF Instances, and their offered services, currently registered in the NRF, satisfying a number of filter criteria, such as those NF Instances offering a certain service name, or those NF Instances of a given NF type (e.g., AMF)."

Feature negotiation is exchanged in first communication between NF consumer/producer. For feature negotiation for Subscription/Notify pattern, the NF consumer usually provides the feature it supports in Subscription Creation Request and NF producer will indicated the feature supported in Subscription Creation Response. The result of feature negotiation will also be applied to notifications in the subscription.

SUMMARY

Certain challenges presently exist. For instance, for default subscriptions there are no steps between the NF producer and the NF consumer for subscription creation. Rather, the NF producer discovers the NF consumer via the Network Repository Function (NRF) and directly delivers the notifications to the NF consumer using the registered callback Uniform Resource Identifier (URI). Without subscription creation message exchange, the NF producer cannot know which optional features are supported by the NF consumer. Accordingly, in such a scenario, when the NF producer sends a notification to the NF consumer, the NF producer will not know whether certain information elements (IEs) should not be included in the notification due to fact that the IEs are not supported by the NF consumer. This disclosure aims to overcome these difficulties.

Accordingly, in one aspect there is provided a method performed by a service consumer. In one embodiment, the method includes invoking a management service provided by a network repository function. Invoking the management service includes generating a management message comprising a profile pertaining to the service consumer and transmitting to the network repository function the management message comprising the profile. The profile comprises first default notification subscription information. The first default notification subscription information includes: a first notification type identifier identifying a first notification type to which the service consumer subscribes by default, wherein notifications of the first notification type are provided by a service producer that provides a service for providing the notifications and ii) first feature support information that identifies one or more features the service consumer supports for the service provided by the service producer for providing the notifications.

In another embodiment the method performed by the service consumer includes receiving, from a service producer, a first message (e.g., a first Hypertext Transfer Protocol (HTTP) message) related to a service provided by the service producer. The first message comprises a header and body. The body comprises a message for the service consumer and the header comprises service producer supported feature information identifying one or more features of the service that are supported by the service producer. The method also includes, in response to the first message, transmitting to the service producer a second message (e.g., a second HTTP message). The second message comprising a header comprising service consumer supported feature information identifying one or more features of the service that are supported by the service consumer.

In another aspect there is provided a method performed by a service producer. In one embodiment, the method includes invoking a discovery service for discovering service consumers. Invoking the discovery service comprises generating a discovery message comprising query parameters and transmitting to a network repository function the discovery message comprising the query parameters. The query parameters include: i) a notification type identifier identifying a type of notification that is provided by the service producer, and ii) a consumer supported features parameter that identifies one or more features that are desired to be supported by a service consumer that subscribes to notifications of the identified type by default.

In another embodiment the method includes receiving from a network repository function a profile for a service consumer. The profile comprises a default notification subscription comprising a supported features information indicating at least a set of information elements supported by the service consumer. The method also includes determining the information elements supported by the service consumer from the supported features information. The method also includes generating a notification for the service consumer based on the determined information elements. The method also includes transmitting the notification to an address identified in the default notification subscription (e.g., an address included in or identified by a Uniform Resource Identifier (URI) identified in the default notification subscription).

In another embodiment the method includes providing a service to a service consumer. Providing the service comprises transmitting to the service consumer a first message (e.g., a first HTTP message) comprising a header and body. The body comprises a message for the service consumer and the header comprises service producer supported feature information identifying one or more features of the service that are supported by the service producer. The method also includes receiving a second message (e.g., a second HTTP message) transmitted by the service consumer in response to the first message. The second message comprises a header comprising service consumer supported feature information identifying one or more features of the service that are supported by the service consumer. The method also includes storing the service consumer supported feature information. The method also includes utilizing the stored service consumer supported feature information when subsequently providing the service to the service consumer.

In another aspect there is provided a method performed by a network repository function, NRF. The method includes receiving the management message described above and/or receiving the discovery message described above.

In another aspect there is provided a computer program comprising instructions which when executed by processing circuitry of a network node causes the network node to perform any one of the methods disclosed herein. In another aspect there is provided a carrier containing the computer program, wherein the carrier is one of an electronic signal, an optical signal, a radio signal, and a computer readable storage medium. In another aspect there is provided a network node, where the network node is configured to perform any one of the methods disclosed herein. In some embodiments, the network node includes processing circuitry and a memory containing instructions executable by the processing circuitry, whereby the network node is configured to perform any one of the methods disclosed herein.

The aspects and embodiments disclosed herein are advantageous for numerous reasons. For example, the embodiments allow an NF as consumer to register supported optional features in default event subscription(s) and allow an NF producer to get the information of supported optional feature of the NF consumer, which allows the NF producer to adjust the content of notification accordingly.

BRIEF DESCRIPTION OF THE DRAWINGS

The accompanying drawings, which are incorporated herein and form part of the specification, illustrate various embodiments.

DETAILED DESCRIPTION

Figure 1:
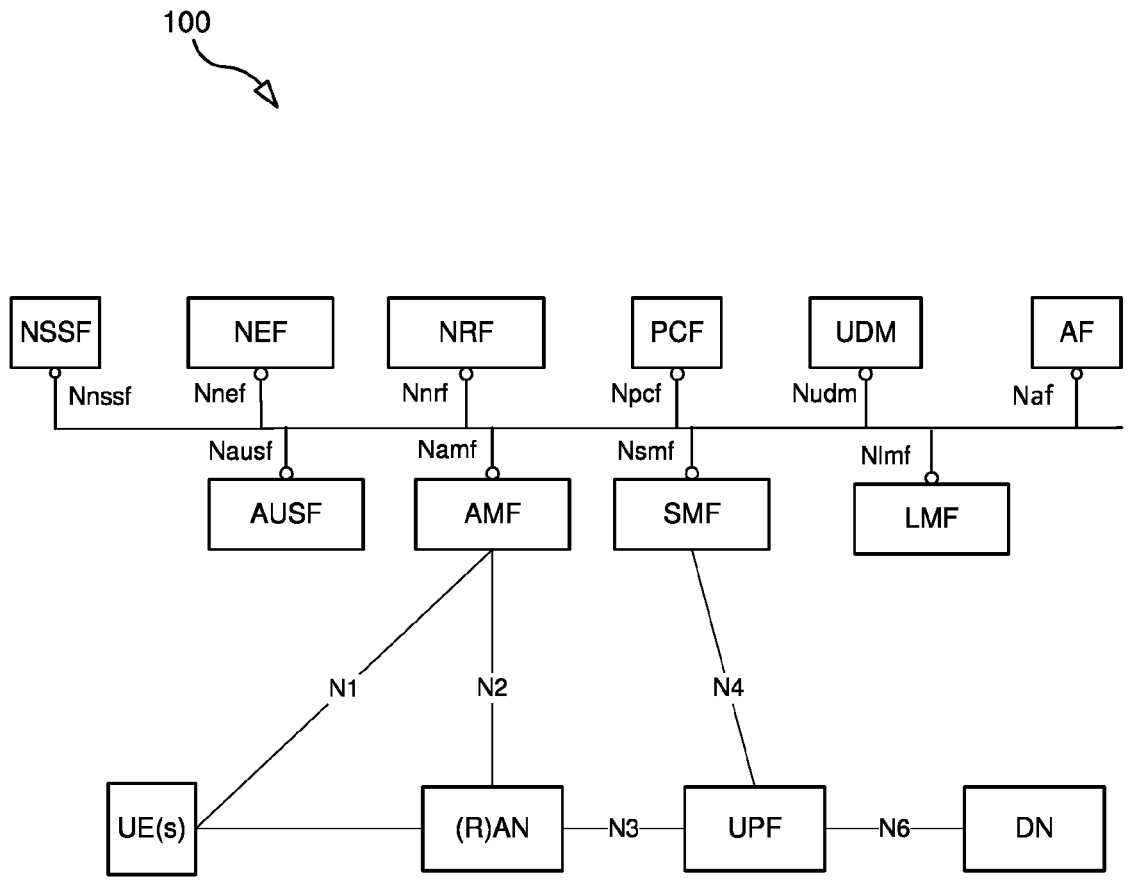
FIG. 1 illustrates an exemplifying wireless communication system.

FIG. 1 illustrates an exemplifying wireless communication system 100 represented as a 5G network architecture that uses service-based interfaces (SBIs). Communication system 100 comprises an Access network (AN) (e.g., a 5G Access Network (5G-AN), which is an access network comprising a Next Generation (NG) Radio Access Network (NG-RAN) and/or a non-3GPP access network connecting to a 5G Core Network)) and a Core network (CN) comprising network entities (NEs) in the form of network Functions (NFs). Typically, the AN comprises base stations, e.g. such as evolved Node Bs (eNBs) or 5G base stations (gNBs) or similar. As shown in FIG. 1, user equipments (UEs) connect to an AN as well as an Access and Mobility Management Function (AMF). As further shown in FIG. 1, the 5G CN NFs include: a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF), a Network Exposure Function (NEF), a Location Management Function (LMF), and a Network Repository Function (NRF).

The NFs in the 5G core network architecture are independent modularized functions, which allows independent evolution and scaling. Modularized function design enables the 5G core network to support various services in a flexible manner. Each NF in the core network interacts with another NF directly, but it is possible to use intermediate functions to route messages from one NF to another NF.

The service(s) that an NF provides to other authorized NFs can be exposed to the authorized NFs through an SBI. In FIG. 1, the SBIs are indicated by the letter "N" followed by the name of the NF, e.g. Namf for the SBI of the AMF and Nsmf for the SBI of the SMF etc.

Some properties of the NFs shown in FIG. 1 may be described in the following manner. The AMF provides UE-based authentication, authorization and mobility management, etc. A UE even if using multiple access technologies is typically connected to a single AMF, since the AMF is independent of the access technologies. However, the UE can be connected to, for example, two AMFs if the UE is connected to two different PLMNs using separate types of access networks (e.g., the UE is connected to a first PLMN via a 3GPP access network and the UE is also connected to a second PLMN via a non-3GPP access network). The SMF is responsible for session management and allocates IP addresses to UEs and selects and controls the UPF for data transfer with respect to the UEs. If a UE has multiple PDU sessions, different SMFs may be allocated to each PDU session to manage them individually and possibly provide different functionalities per PDU session. The AF provides information on the packet flow to PCF responsible for policy control in order to support Quality of Service (QoS). Based on the information, PCF determines policies about mobility and session management to make AMF and SMF operate properly. The AUSF supports authentication function for UEs and thus stores data for authentication of UEs or similar while UDM stores subscription data of UEs. The Data network (DN), not part of the 5G core network, provides Internet access or operator services and similar. The LMF receives measurements and assistance information from the NG-RAN and the UE via the AMF to compute the position of the UE.

The NRF supports the following functionality: 1) maintains the NF profile of available NF instances and their supported services; 2) allows other NF instances to subscribe to, and get notified about, the registration in NRF of new NF instances of a given type; and 3) supports a discovery function. It receives NF Discover requests from NF instances, and provides the information of the available NF instances fulfilling certain search criteria. Features of the NRF are specified in 3GPP Technical Specification (TS) 29.501 (see e.g. 3GPP TS 29.501 v16.0.0).

A number of 5G core network NFs of different types are typically instantiated per default in a 5G core network, e.g. such as an AMF, a NRF, a PCF and a SMF etc. Other 5G core network NFs may be instantiated as needed and several NFs of the same type can also be instantiated if required, e.g. to distribute load to additional NF(s) of the same typ. Thus, an NF instance may be seen as an example or a specimen of a certain NF. Herein, the terms NF and NF instance are used interchangeably, unless otherwise expressly stated or is apparent from the context in which the terms are used. An NF instance exposes one or more NF Service Instances.

The NRF is one of the main key components of the 5G Service Based Architecture. The NRF maintains an updated repository of all the 5G elements available in the operator's network along with the services provided by each of the elements in the 5G core that are expected to be instantiated, scaled and terminated without or minimal manual intervention. The NRF supports discovery mechanisms that allows 5G elements to discover each other and get updated status of the desired elements. The NRF supports the following functions: maintains the profiles of the available NF instances and their supported services in the 5G core network; allows consumer NF instances to discover other providers NF instances in the 5G core network; allows NF instances to track the status of other NF instances. The NRF interacts with every other element in the 5G core network and it supports the above functions through the management and discovery services.

Figure 2:
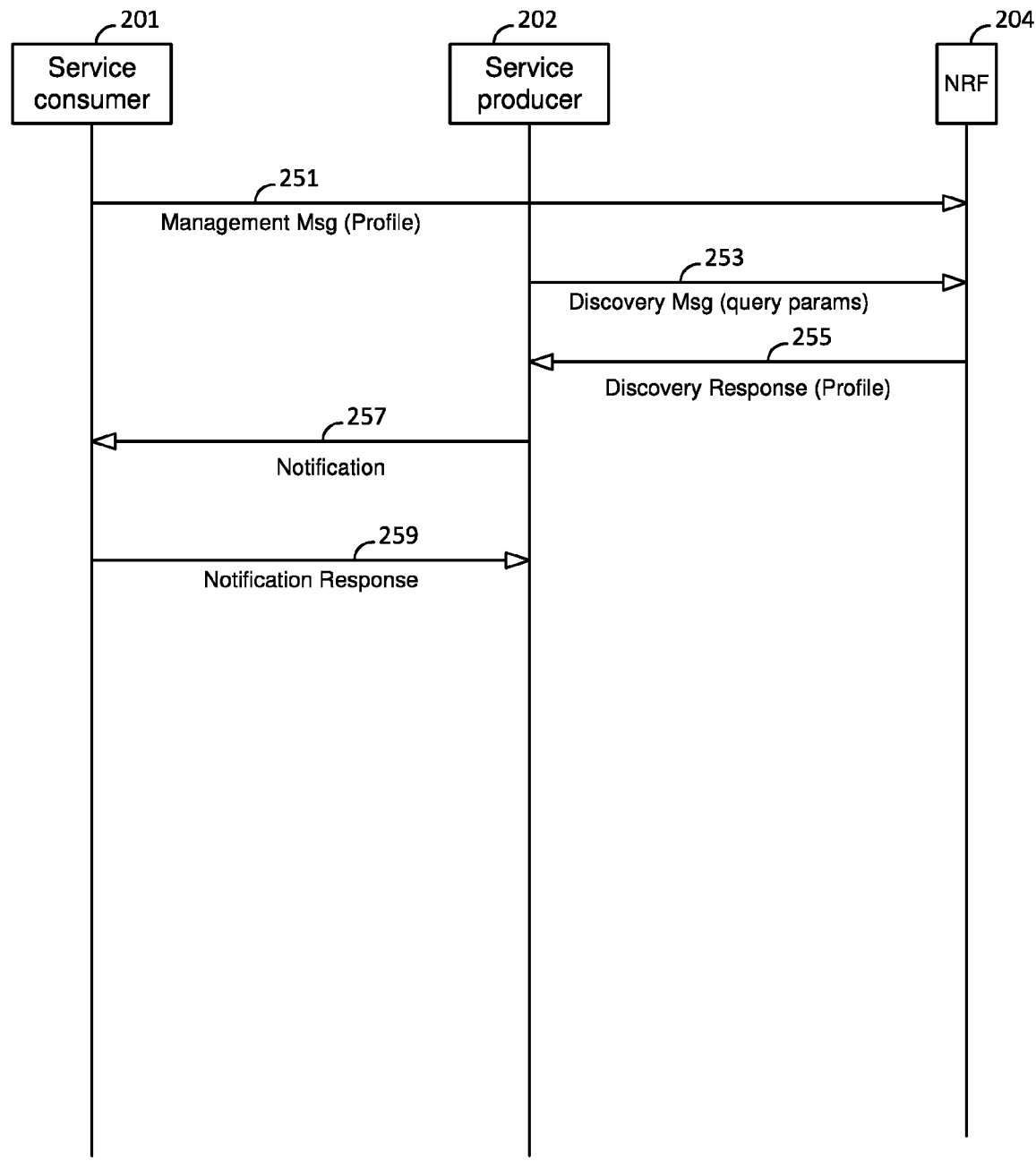
FIG. 2 is a message flow diagram illustrating a message flow according to an embodiment.

FIG. 2 is a message flow diagram illustrating a message flow according to an embodiment. The message flow may begin with a service consumer 201 transmitting to NRF 204 a management message 251 (e.g., a registration message). The management message includes a profile pertaining to service consumer 201. For example, service consumer may invoke the NRFRegister operation described in TS 29.510. That is, transmitting the management message 251 to the NRF may consist of service consumer 201 transmitting to NRF 204 a Hypertext Transfer Protocol (HTTP) PUT message that comprises an NFProfile for the service consumer.

In one embodiment, the profile included in the management message 251 comprises first default notification subscription information that comprises: i) a first notification type identifier identifying a first notification type to which the service consumer subscribes by default, where notifications of the first notification type are provided by a service producer that provides a service for providing the notifications and ii) first feature support information that identifies one or more features the service consumer supports for the service provided by the service producer for providing the notifications.

In one embodiment the default notification subscription information is of a type that is an extension of the DefaultNotificationSubscription type defined in TS 29.510. For example, the default notification subscription information may include the following information elements (IEs) (e.g., attribute value pairs):

| Attribute name | Data type | Description |
| --- | --- | --- |
| notificationType | Notification Type | Type of notification for which the corresponding callback URI is provided. |
| callbackUri | Uri | This attribute contains a default notification endpoint to be used by a NF Service Producer towards an NF Service Consumer that has not registered explicitly a callback URI in the NF Service Producer (e.g. as a result of an implicit subscription). |
| n1MessageClass | N1MessageClass | If the notification type is N1_MESSAGES, this IE shall be present and shall identify the class of N1 messages to be notified. |
| n2InformationClass | N2InformationClass | If the notification type is N2_INFORMATION, this IE shall be present and shall identify the class of N2 information to be notified. |
| versions | array(string) | API versions (e.g. "v1") supported for the default notification type. |
| nfConsumerSupportedFeatures | SupportedFeatures | When present, this IE indicates the supported features as NF consumer for the default notification subscription. (Note1 and Note2) |
| binding | string | When present, this IE shall contain the value of the Binding Indication for the default subscription notification (i.e. the value part of "3gpp-Sbi-Binding" header), as specified in clause 6.12.4 of 3GPP TS 29.500. |

NOTE 1:
The supported features of the IE are related to the Service API of the subscription. e.g. for notification type "N1_MESSAGE" which should generated by a subscription to Namf_Communication service, the supported features in the IE shall be the features specified by Namf_Communication (clause 6.1.8 of 3GPP TS 29.518).
NOTE 2:
An NF producer shall send the notification to the default subscription by considering the supported feature of the NF consumer, e.g. only include the IEs controlled by certain optional feature in case the NF consumer supports the feature.

Accordingly, in one embodiment, a new information element (IE), preferably called "nfConsumerSupportedFeatures," is added to the Default Notification Subscription message to allow an NF consumer to indicate supported features of a corresponding API for the notification. In this way, an NF producer can determine the supported feature of the NF consumer and adjust content of the notification accordingly.

The message flow may also include service producer 202 transmitting a discovery message 253 to NRF 204, the discovery message 253 includes query parameters. For example, service producer 202 may invoke the NFDiscover operation described in TS 29.510. That is, transmitting the discovery message 253 to the NRF may consist of service producer 202 transmitting to NRF 204 a Hypertext Transfer Protocol (HTTP) GET message that comprises the query parameters. Query parameters that may be included in the GET message (discovery message) are identified in table 6.2.3.2.3.1-1 of TS 29.510, which is reproduced in part below:

| Name | Data type | Description |
|---|---|---|
| target-nf-type | NFType | This IE shall contain the NF type of the target NF being discovered. |
| requester-nf-type | NFType | This IE shall contain the NF type of the Requester NF that is invoking the Nnrf_NFDiscovery service. |
| requester-nf-instance-id | NfInstanceId | If included, this IE shall contain the NF instance id of the Requester NF. |
| service-names | array(ServiceName) | If included, this IE shall contain an array of service names for which the NRF is queried to provide the list of NF profiles. The NRF shall return the NF profiles that have at least one NF service matching the NF service names in this list. The NF service names returned by the NRF shall be an interclause of the NF service names requested and the NF service names registered in the NF profile. If not included, the NRF shall return all the NF service names registered in the NF profile. Contains unique items. |
| requester-nf-instance-fqdn | Fqdn | This IE may be present for an NF discovery request within the same PLMN as the NRF. If included, this IE shall contain the FQDN of the Requester NF that is invoking the Nnrf_NFDiscovery service. The NRF shall use this to return only those NF profiles that include at least one NF service containing an entry in the "allowedNfDomains" list (see clause 6.1.6.2.3) that matches the domain of the requester NF. This IE shall be ignored by the NRF if it is received from a requester NF belonging to a different PLMN. (NOTE 12) |
| target-plmn-list | array(PlmnId) | This IE shall be included when NF services in a different PLMN, or NF services of specific PLMN ID(s) in a same PLMN comprising multiple PLMN IDs, need to be discovered. When included, this IE shall contain the PLMN ID of the target NF. If more than one PLMN ID is included, NFs from any PLMN ID present in the list matches the query parameter. For inter-PLMN service discovery, at most 1 PLMN ID shall be included in the list; it shall be included in the service discovery from the NF in the source PLMN sent to the NRF in the same PLMN, while it may be absent in the service discovery request sent from the source NRF to the target NRF. In such case, if the NRF receives more than 1 PLMN ID, it shall only consider the first element of the array, and ignore the rest. |
| requester-plmn-list | array(PlmnId) | This IE shall be included when NF services in a different PLMN need to be discovered. When included, this IE shall contain the PLMN ID(s) of the requester NF. (NOTE 12) |
| requester-snpn-list | array(PlmnIdNid) | This IE shall be included when the Requester NF belongs to one or several SNPNs, and NF services of a specific SNPN need to be discovered. When present, this IE shall contain the SNPN ID(s) of the requester NF. The NRF shall use this to return only those NF profiles of NF Instances allowing to be discovered from the SNPNs identified by this IE, according to the "allowedSnpns" list in the NF Profile and NF Service (see clauses 6.1.6.2.2 and 6.1.6.2.3). |
| target-nf-instance-id | NfInstanceId | Identity of the NF instance being discovered. |
| target-nf-fqdn | Fqdn | FQDN of the target NF instance being discovered. |
| hnrf-uri | Uri | If included, this IE shall contain the API URI of the NFDiscovery Service (see clause 6.2.1) of the home NRF. It shall be included if the Requester NF has previously received such API URI to be used for service discovery (e.g., from the NSSF in the home PLMN). |
| snssais | array(Snssai) | If included, this IE shall contain the list of S-NSSAIs that are served by the NF (Service) Instances being discovered. The NRF shall return those NF profiles/NF services of NF (Service) Instances that have at least one of the S-NSSAIs in this list. The S-NSSAIs included in the NF profiles/NF services of NF (Service) Instances returned by the NRF shall be an interclause of the S-NSSAIs requested and the S-NSSAIs supported by those NF (Service) Instances. (NOTE 10) When the NF Profile of the NF Instances being discovered has defined the list of supported S-NSSAis in the "perPlmnSnssaiList", the discovered |

-continued

| Name | Data type | Description |
|---|---|---|
| | | NF Instances shall be those having any of the S-NSSAIs included in this "snssais" parameter in any of the PLMNs included in the "target-plmn-list" attribute, if present; if the "target-plmn-list" is not included, the NRF shall assume that the discovery request is for any of the PLMNs it supports. |
| requester-snssais | array(Snssai) | If included, this IE shall contain the list of S-NSSAI of the requester NF. If this IE is included in a service discovery in a different PLMN, the requester NF shall provide S-NSSAI values of the target PLMN, that correspond to the S-NSSAI values of the requester NF. The NRF shall use this to return only those NF profiles of NF Instances allowing to be discovered from at least one network slice identified by this IE, according to the "allowedNssais" list in the NF Profile and NF Service (see clause 6.1.6.2.2 and 6.1.6.2.3). (NOTE 12) |
| plmn-specific-snssai-list | array(PlmnSnssai) | If included, this IE shall contain the list of S-NSSAI that are served by the NF service being discovered for the corresponding PLMN provided. The NRF shall use this to identify the NF services that have registered their support for the S-NSSAIs for the corresponding PLMN given. The NRF shall return the NF profiles that have at least one S-NSSAI supported in any of the PLMNs provided in this list. The per PLMN list of S-NSSAIs included in the NF profile returned by the NRF shall be an interclause of the list requested and the list registered in the NF profile. (NOTE 10). |
| requester-plmn-specific-snssai-list | array(PlmnSnssai) | If included, this IE shall contain the list of S-NSSAI of the requester NF, for each of the PLMNs it supports. The NRF shall use this to return only those NF profiles of NF Instances allowing to be discovered from at least one network slice identified by this IE, according to the "allowedNssais" and "allowedPlmns" attributes in the NF Profile and NF Service (see clause 6.1.6.2.2 and 6.1.6.2.3). (NOTE 12) |
| nsi-list | array(string) | If included, this IE shall contain the list of NSI IDs that are served by the services being discovered. |
| dnn | Dnn | If included, this IE shall contain the DNN for which NF services serving that DNN is discovered. DNN may be included if the target NF type is e.g. "BSF", "SMF", "PCF", "PCSCF" or "UPF". The DNN shall contain the Network Identifier and it may additionally contain an Operator Identifier. (NOTE 11). If the Snssai(s) are also included, the NF services serving the DNN shall be available in the network slice(s) identified by the Snssai(s). |
| smf-serving-area | string | If included, this IE shall contain the serving area of the SMF. It may be included if the target NF type is "UPF". |
| tai | Tai | Tracking Area Identity. |
| amf-region-id | AmfRegionId | AMF Region Identity. |
| amf-set-id | AmfSetId | AMF Set Identity. |
| guami | Guami | Guami used to search for an appropriate AMF. (NOTE 1) |
| supi | Supi | If included, this IE shall contain the SUPI of the requester UE to search for an appropriate NF. SUPI may be included if the target NF type is e.g. "PCF", "CHF", "AUSF", "UDM" or "UDR". |
| ue-ipv4-address | Ipv4Addr | The IPv4 address of the UE for which a BSF or P-CSCF needs to be discovered. |
| ip-domain | string | The IPv4 address domain of the UE for which a BSF needs to be discovered. |
| ue-ipv6-prefix | Ipv6Prefix | The IPv6 prefix of the UE for which a BSF or P-CSCF needs to be discovered. |
| pgw-ind | boolean | When present, this IE indicates whether a combined SMF/PGW-C or a standalone SMF needs to be discovered. true: A combined SMF/PGW-C is requested to be discovered; false: A standalone SMF is requested to be discovered. (See NOTE 2) |
| pgw | Fqdn | If included, this IE shall contain the PGW FQDN which is received by the AMF from the MME to find the combined SMF/PGW. |
| gpsi | Gpsi | If included, this IE shall contain the GPSI of the requester UE to search for an appropriate NF. GPSI may be included if the target NF type is "CHF", "PCF", "UDM" or "UDR". |
| external-group-identity | ExtGroupId | If included, this IE shall contain the external group identifier of the requester UE to search for an appropriate NF. This may be included if the target NF type is "UDM" or "UDR". |
| pfd-data | PfdData | When present, this IE shall contain the application identifiers and/or application function identifiers in PFD management. This may be included if the target NF type is "NEF". |
| data-set | DataSetId | Indicates the data set to be supported by the NF to be discovered. May be included if the target NF type is "UDR". |
| routing-indicator | string | Routing Indicator information that allows to route network signalling with SUCI (see 3GPP 23.003 [12]) to an AUSF and UDM instance capable to serve the subscriber. May be included if the target NF type is "AUSF" or "UDM". Pattern: "^[0-9]{1, 4}$" |

| Name | Data type | Description |
| --- | --- | --- |
| group-id-list | array(NfGroupId) | Identity of the group(s) of the NFs of the target NF type to be discovered. May be included if the target NF type is "UDR", "UDM", "HSS", "PCF", "AUSF" or "CHF". |
| dnai-list | array(Dnai) | If included, this IE shall contain the Data network access identifiers. It may be included if the target NF type is "UPF". |
| upf-iwk-eps-ind | boolean | When present, this IE indicates whether a UPF supporting interworking with EPS needs to be discovered. true: A UPF supporting interworking with EPS is requested to be discovered; false: A UPF not supporting interworking with EPS is requested to be discovered. (NOTE 3) |
| chf-supported-plmn | PlmnId | If included, this IE shall contain the PLMN ID that a CHF supports (i.e., in the PlmnRange of ChfInfo attribute in the NFProfile). This IE may be included when the target NF type is "CHF". |
| preferred-locality | string | Preferred target NF location (e.g. geographic location, data center). When present, the NRF shall prefer NF profiles with a locality attribute that matches the preferred-locality. The NRF may return additional NFs in the response not matching the preferred target NF location, e.g. if no NF profile is found matching the preferred target NF location. The NRF should set a lower priority for any additional NFs on the response not matching the preferred target NF location than those matching the preferred target NF location. (NOTE 6) |
| access-type | AccessType | If included, this IE shall contain the Access type which is required to be supported by the target Network Function (i.e. SMF). |
| supported-features | SupportedFeatures | List of features required to be supported by the target Network Function. This IE may be present only if the service-names attribute is present and if it contains a single service-name. It shall be ignored by the NRF otherwise. (NOTE 4) |
| required-features | array(SupportedFeatures) | List of features required to be supported by the target Network Function, as defined by the supportedFeatures attribute in NFService (see clauses 6.1.6.2.3 and 6.2.6.2.4). This IE may be present only if the service-names attribute is present. When present, the required-features attribute shall contain as many entries as the number of entries in the service-names attribute. The $n^{th}$ entry in the required-features attribute shall correspond to the $n^{th}$ entry in the service-names attribute. An entry corresponding to a service for which no specific feature is required shall be encoded as "0". |
| complex-query | ComplexQuery | This query parameter is used to override the default logical relationship of query parameters. |
| limit | integer | Maximum number of NFProfiles to be returned in the response. Minimum: 1 |
| max-payload-size | integer | Maximum payload size (before compression, if any) of the response, expressed in kilo octets. When present, the NRF shall limit the number of NF profiles returned in the response such as to not exceed the maximum payload size indicated in the request. Default: 124. Maximum: 2000 (i.e. 2 Mo). |
| max-payload-size-ext | integer | Maximum payload size (before compression, if any) of the response, expressed in kilo octets. When present, the NRF shall limit the number of NF profiles returned in the response such as to not exceed the maximum payload size indicated in the request. This query parameter is used when the consumer supports payload size bigger than 2 million octets. Default: 124 |
| pdu-session-types | array(PduSessionType) | List of the PDU session type (s) requested to be supported by the target Network Function (i.e UPF). |
| event-id-list | array(EventId) | If present, this attribute shall contain the list of events requested to be supported by the Nnwdaf AnalyticsInfo Service, the NRF shall return NF which support all the requested events. |
| nwdaf-event-list | array(NwdafEvent) | If present, this attribute shall contain the list of events requested to be supported by the Nnwdaf_EventsSubscription service, the NRF shall return NF which support all the requested events. |
| atsss-capability | AtsssCapability | When present, this IE indicates the ATSSS capability of the target UPF needs to be supported. |
| upf-ue-ip-addr-ind | boolean | When present, this IE indicates whether a UPF supporting allocating UE IP addresses/prefixes needs to be discovered. true: a UPF supporting UE IP addresses/prefixes allocation is requested to be discovered; false: a UPF not supporting UE IP addresses/prefixes allocation is requested to be discovered. |
| client-type | ExternalClientType | When present, this IE indicates that NF(s) dedicatedly serving the specified Client Type needs to be discovered. This IE may be included when target NF Type is "LMF" and "GMLC". If no NF profile is found dedicatedly serving the requested client type, the NRF may return NF(s) not dedicatedly serving the request client type in the response. |

-continued

| Name | Data type | Description |
|---|---|---|
| lmf-id | LMFIdentification | When present, this IE shall contain LMF identification to be discovered. This may be included if the target NF type is "LMF". |
| an-node-type | AnNodeType | If included, this IE shall contain the AN Node type which is required to be supported by the target Network Function (i.e. LMF). |
| rat-type | RatType | If included, this IE shall contain the RAT type which is required to be supported by the target Network Function (i.e. LMF). |
| target-snpn | PlmnIdNid | This IE shall be included when NF services of a specific SNPN need to be discovered. When included, this IE shall contain the PLMN ID and NID of the target NF. |
| af-ee-data | AfEventExposureData | When present, this shall contain the application events, and optionally application function identifiers, application identifiers of the AF(s). This may be included if the target NF type is "NEF". |
| w-agf-info | WAgfInfo | If included, this IE shall contain the W-AGF identifiers of N3 terminations which is received by the SMF to find the combined W-AGF/UPF. |
| tngf-info | TngfInfo | If included, this IE shall contain the TNGF identifiers of N3 terminations which is received by the SMF to find the combined TNGF/UPF. |
| twif-info | TwifInfo | If included, this IE shall contain the TWIF identifiers of N3 terminations which is received by the SMF to find the combined TWIF/UPF. |
| target-nf-set-id | NfSetId | When present, this IE shall contain the target NF Set ID (as defined in clause 28.12 of 3GPP TS 23.003 [12]) of the NF instances being discovered. |
| target-nf-service-set-id | NfServiceSetId | When present, this IE shall contain the target NF Service Set ID (as defined in clause 28.13 of 3GPP TS 23.003 [12]) of the NF service instances being discovered. |
| preferred-tai | Tai | When present, the NRF shall prefer NF profiles that can serve the TAI, or the NRF shall return NF profiles not matching the TAI if no NF profile is found matching the TAI. (NOTE 5) |
| nef-id | NefId | When present, this IE shall contain the NEF ID of the NEF to be discovered. This may be included if the target NF type is "NEF". (NOTE 7) |
| preferred-nf-instances | array(NfInstanceId) | When present, this IE shall contain a list of preferred candidate NF instance IDs. (NOTE 8) |
| notification-type | NotificationType | If included, this IE shall contain the notification type of default notification subscriptions that shall be registered in the NFProfile or NFService of the NF Instances being discovered. The NF profiles returned by the NRF shall contain all the registered default notification subscriptions, including the one corresponding to the notification-type parameter. (NOTE 9) |
| n1-msg-class | N1MessageClass | This IE may be included when "notification-type" IE is present with value "N1_MESSAGES". When included, this IE shall contain the N1 message class of default notification subscriptions that shall be registered in the NFProfile or NFService of the NF Instances being discovered. The NF profiles returned by the NRF shall contain all the registered default notification subscriptions, including the one corresponding to the n1-msg-class parameter. (NOTE 9) |
| n2-info-class | N2InformationClass | This IE may be included when "notification-type" IE is present with value "N2_INFORMATION". If included, this IE shall contain the notification type of default notification subscriptions that shall be registered in the NFProfile or NFService of the NF Instances being discovered. The NF profiles returned by the NRF shall contain all the registered default notification subscriptions, including the one corresponding to the n2-info-class parameter. (NOTE 9) |
| serving-scope | array(string) | If present, this attribute shall contain the list of areas that can be served by the NF instances to be discovered. The NRF shall return NF profiles of NFs which can serve all the areas requested in this query parameter. |
| imsi | string | If included, this IE shall contain the IMSI of the requester UE to search for an appropriate NF. IMSI may be included if the target NF type is "HSS". pattern: "[0-9]{5, 15}" |
| ims-private-identity | string | If included, this IE shall contain the IMS Private Identity of the requester UE to search for an appropriate NF. IMS Private Identity may be included if the target NF type is "HSS". |
| ims-public-identity | string | If included, this IE shall contain the IMS Public Identity of the requester UE to search for an appropriate NF. IMS Public Identity may be included if the target NF type is "HSS". |
| msisdn | string | If included, this IE shall contain the MSISDN of the requester UE to search for an appropriate NF. IMS Public Identity may be included if the target NF type is "HSS". |
| internal-group-identity | GroupId | If included, this IE shall contain the internal group identifier of the UE to search for an appropriate NF. This may be included if the target NF type is "UDM" |
| preferred-api-versions | map(string) | When present, this IE indicates the preferred API version of the services that are supported by the target NF instances. The key of the map is the ServiceName (see clause 6.1.6.3.11) for which the |

| Name | Data type | Description |
| --- | --- | --- |
| | | preferred API version is indicated. Each element carries the API Version Indication for the service indicated by the key. The NRF may return additional NFs in the response not matching the preferred API versions, e.g. if no NF profile is found matching the preferred-api-versions. An API Version Indication is a string formatted as {operator} + {API Version}. The following operators shall be supported:<br>"=" match a version equals to the version value indicated.<br>">" match any version greater than the version value indicated<br>">=" match any version greater than or equal to the version value indicated<br>"<" match any version less than the version value indicated<br>"<=" match any version less than or equal to the version value indicated<br>"~" match any version compatible with the version indicated, i.e. any version with the same major version as the version indicated.<br>Precedence between versions is identified by comparing the Major, Minor, and Patch version fields numerically, from left to right.<br>If no operator or an unknown operator is provided in API Version Indication, "=" operator is applied.<br>Example of API Version Indication:<br>Case1: "=1.2.4.operator-ext" or "1.2.4.operator-ext" means matching the service with API version "1.2.4.operator-ext"<br>Case2: ">1.2.4" means matching the service with API versions greater than "1.2.4"<br>Case3: "~2.3.0" or "~2" means matching the service with all API versions with major version "2". |
| v2x-support-ind | boolean | When present, this IE indicates whether a PCF supporting V2X Policy/Parameter provisioning needs to be discovered.<br>true: a PCF supporting V2X Policy/Parameter provisioning is requested to be discovered;<br>false: a PCF not supporting V2X Policy/Parameter provisioning is requested to be discovered. |
| redundant-gtpu | boolean | When present, this IE indicates whether a UPF supporting redundant GTP-U path needs to be discovered.<br>true: a UPF supporting redundant GTP-U path is requested to be discovered;<br>false: a UPF not supporting redundant GTP-U path is requested to be discovered. |
| redundant-transport | boolean | When present, this IE indicates whether a UPF supporting redundant transport path on the transport layer in the corresponding network slice needs to be discovered.<br>true: a UPF supporting redundant transport path on the transport layer is requested to be discovered;<br>false: a UPF not supporting redundant transport path on the transport layer is requested to be discovered.<br>If the Snssai(s) are also included, the UPF supporting redundant transport path on the transport layer shall be available in the network slice(s) identified by the Snssai(s). |
| ipups | boolean | When present, this IE indicates whether a UPF which is configured for IPUPS is requested to be discovered.<br>true: a UPF which is configured for IPUPS is requested to be discovered;<br>false: a UPF which is not configured for IPUPS is requested to be discovered. |
| scp-domain-list | array(string) | When present, this IE shall contain the SCP domain(s) the target NF or SCP belongs to. The NRF shall return NF or SCP profiles that belong to all the SCP domains provided in this list. |
| address-domain | Fqdn | If included, this IE shall contain the address domain that shall be reachable through the SCP. This IE may be included when the target NF type is "SCP". |
| ipv4-addr | Ipv4Addr | If included, this IE shall contain the IPv4 address that shall be reachable through the SCP. This IE may be included when the target NF type is "SCP". |
| ipv6-prefix | Ipv6Prefix | If included, this IE shall contain the IPv6 prefix that shall be reachable through the SCP. This IE may be included when the target NF type is "SCP". |
| served-nf-set-id | NfSetId | When present, this IE shall contain the NF Set ID that shall be reachable through the SCP. This IE may be included when the target NF type is "SCP". |
| remote-plmn-id | PlmnId | If included, this IE shall contain the remote PLMN ID that shall be reachable through the SCP. This IE may be included when the target NF type is "SCP". |

| Name | Data type | Description |
| --- | --- | --- |
| data-forwarding | boolean | This may be included if the target NF type is "UPF". (NOTE 13) When present, the IE indicates whether UPF(s) configured for data forwarding needs to be discovered. true: UPF(s) configured for data forwarding is requested to be discovered; false: UPF(s) not configured for data forwarding is requested to be discovered. |
| preferred-full-plmn | boolean | When present, the NRF shall prefer NF profile(s) that can serve the full PLMN (i.e. can serve any TAI in the PLMN), or the NRF shall return other NF profiles if no NF profile serving the full PLMN is found: true: NF instance(s) serving the full PLMN is preferred; false: NF instance(s) serving the full PLMN is not preferred. (NOTE 14) |
| requester-features | SupportedFeatures | Nnrf_NFDiscovery features supported by the Requester NF that is invoking the Nnrf_NFDiscovery service. This IE shall be included if at least one feature is supported by the Requester NF. |
| realm-id | string | May be included if the target NF type is "UDSF". If included, this IE shall contain the realm-id for which a UDSF shall be discovered. |
| storage-id | string | May be included if the target NF type is "UDSF" and realm-id is included. If included, this IE shall contain the storage-id for the realm-id indicated in the realm-id IE for which a UDSF shall be discovered. |
| vsmf-support-ind | boolean | If included, this IE shall indicate that target SMF(s) that support V-SMF Capability are preferred. This IE may be included when the target NF type is "SMF". (NOTE 15) |

In one embodiment, in addition to including one or more of the above query parameters, the query parameters may also include: i) a notification type identifier identifying a type of notification that is provided by the service producer, and ii) a consumer supported features parameter that identifies one or more features that are desired to be supported by a service consumer that subscribes to notifications of the identified type by default. In this way, it is possible that the NF producer may indicate the required supported feature of a NF consumer for the specific default subscription. For example, in one embodiment, a new query parameter (e.g., "nfConsumerSupportedFeatures") is provided that indicates the supported feature required of the candidate NF as consumer, when perform a selection of NF consumer to receive a notification for default notification subscription, together with an existing query parameter, "Notification-Type."

In response to discovery message 253, NRF 204 transmits to service producer 202 a discovery response message 255 that may comprise one or more service consumer profiles that match the query parameters.

After receiving the discovery response message 255, service producer 202 may transmit to service consumer 201 a notification message 257 due to the fact that service producer 202 has determined, based on the profile of service consumer 201, that service consumer 201 has subscripted to this notification by default. Transmitting the notification message may consists of service producer 202 transmitting an HTTP message comprising a set of one or more headers and a body, where the body comprises the notification message 257.

In one embodiment, a new HTTP header is introduced (e.g., 3gpp-Sbi-supported-feature) or an existing HTTP customer header is re-used when suitable, so the service producer 202 can include the header indicating its supported features in the HTTP message, and the service consumer 201 can include its supported feature in the notification response message 259.

Figure 3:
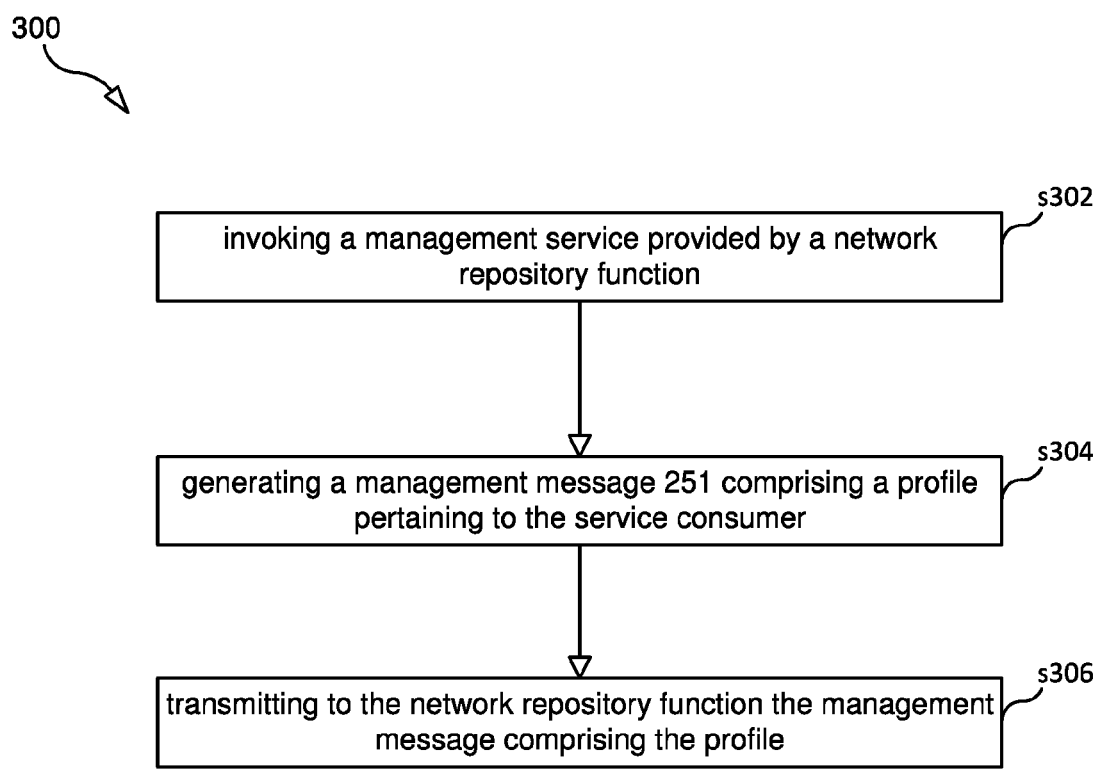
FIG. 3 is a flowchart illustrating a process according to an embodiment.

FIG. 3 is a flowchart illustrating a process 300 according to an embodiment. Process 300 is performed by service consumer 201 and may begin in step s302.

Step s302 comprises invoking a management service provided by a network repository function (e.g., NRF 204). Invoking the management service includes generating a management message (e.g., message 251) comprising a profile pertaining to the service consumer (step s304) and transmitting to the network repository function the management message comprising the profile (step s306). The profile comprises first default notification subscription information. The first default notification subscription information includes: a first notification type identifier identifying a first notification type to which the service consumer subscribes by default, wherein notifications of the first notification type are provided by a service producer that provides a service for providing the notifications and ii) first feature support information that identifies one or more features the service consumer supports for the service provided by the service producer for providing the notifications.

In some embodiments, the management message is an HTTP PUT message comprising the profile. In some embodiments, the management message is transmitted either i) for an initial service registration or ii) for an update of a service registration. In some embodiments, the service is a communication service provided by an instance of an Access and Mobility Management Function (AMF) (e.g., Namf_Communication service). In some embodiments, the service consumer is at least an instance of a Location Management Function (LMF) or an Access and Mobility Management Function (AMF). In some embodiments, the first feature support information is a string containing a bitmask indicating supported features.

Figure 4:
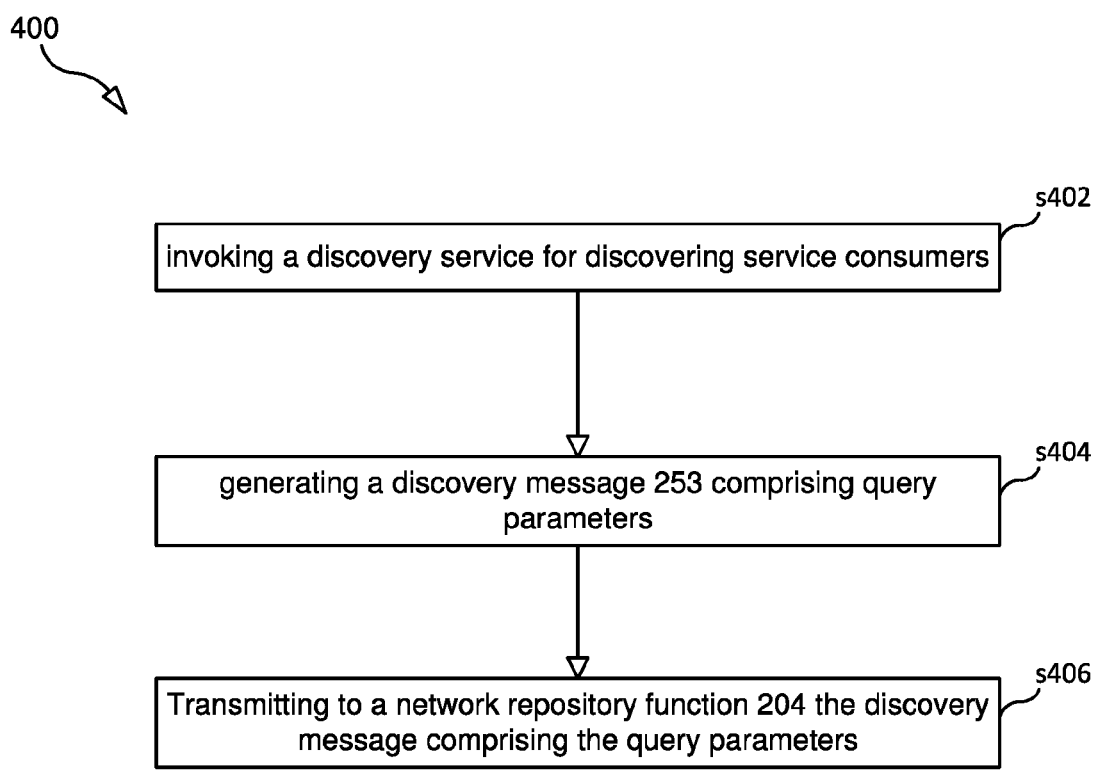
FIG. 4 is a flowchart illustrating a process according to an embodiment.

FIG. 4 is a flowchart illustrating a process 400 according to an embodiment. Process 400 is performed by service producer 202 and may begin in step s402. Step s402 comprises invoking a discovery service for discovering service consumers. Invoking the discovery service comprises: generating a discovery message comprising query parameters (step s404) and transmitting to a network repository function the discovery message comprising the query parameters (s406). The query parameters include: i) a notification type identifier identifying a type of notification that is provided by the service producer, and ii) a consumer supported features parameter that identifies one or more features that are desired to be supported by a service consumer that subscribes to notifications of the identified type by default.

In some embodiments, the discovery message comprises an indicator indicating that the one or more features identified by the consumer supported features parameter are required to be supported by the service consumer. In some embodiments, the discovery message comprises an indicator indicating that the one or more features identified by the consumer supported features parameter are preferred to be supported by the service consumer. In some embodiments, the discovery message is an HTTP GET message comprising the query parameters. In some embodiments, the service producer is at least an instance of an Access and Mobility Management Function (AMF). In some embodiments, the service consumer is at least an instance of a Location Management Function (LMF) or an Access and Mobility Management Function (AMF). In some embodiments, the consumer supported features parameter is a string containing a bitmask identifying the one or more features.

Figure 5:
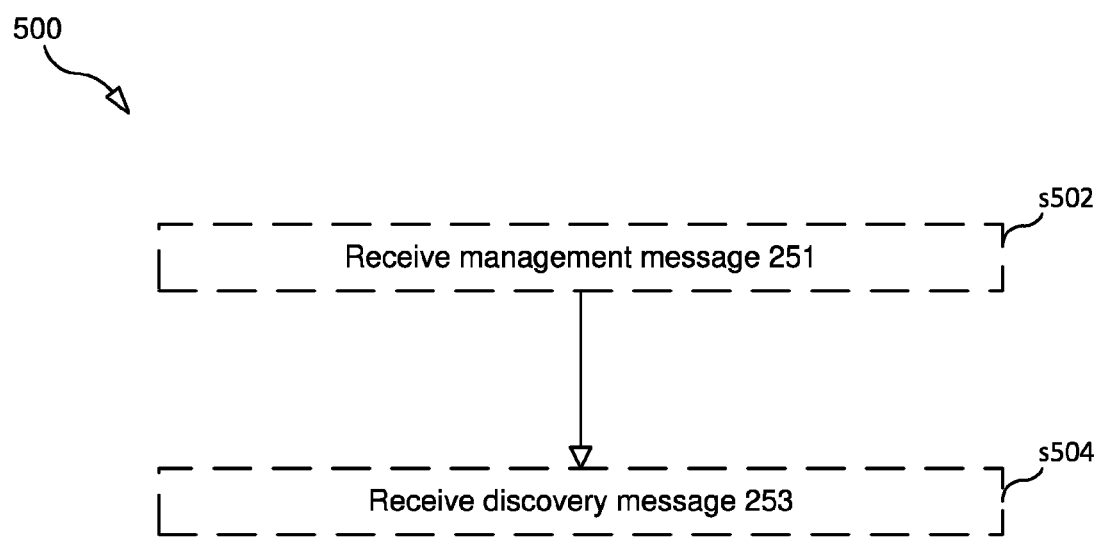
FIG. 5 is a flowchart illustrating a process according to an embodiment.

FIG. 5 is a flowchart illustrating a process 500 according to an embodiment. Process 500 is performed by NRF 204 and may begin in step s502. Step s502 comprises the NRF receiving the management message 251 and/or receiving the discovery message 253. In some embodiments, the NRF receives the management message defined in claim A1 and stores the profile in a data repository. In some embodiments, the NRF receives the discovery message defined in claim B1, an the NRF determines whether the profile matches the query parameters.

In some embodiments, the NRF transmits a response to the discovery message and the response includes the profile only if the NRF determines that the profile indicates that the service consumer supports the desired features.

In some embodiments, the NRF transmits a response to the discovery message and the response includes the profile even in the event that the NRF determines that the profile indicates that the service consumer does not support the desired features.

In some embodiments, determining whether the profile matches the query parameters comprises determining whether a feature identified by the consumer supported features parameter is also identified by the first feature support information that was included in the first default notification subscription information.

Figure 6:
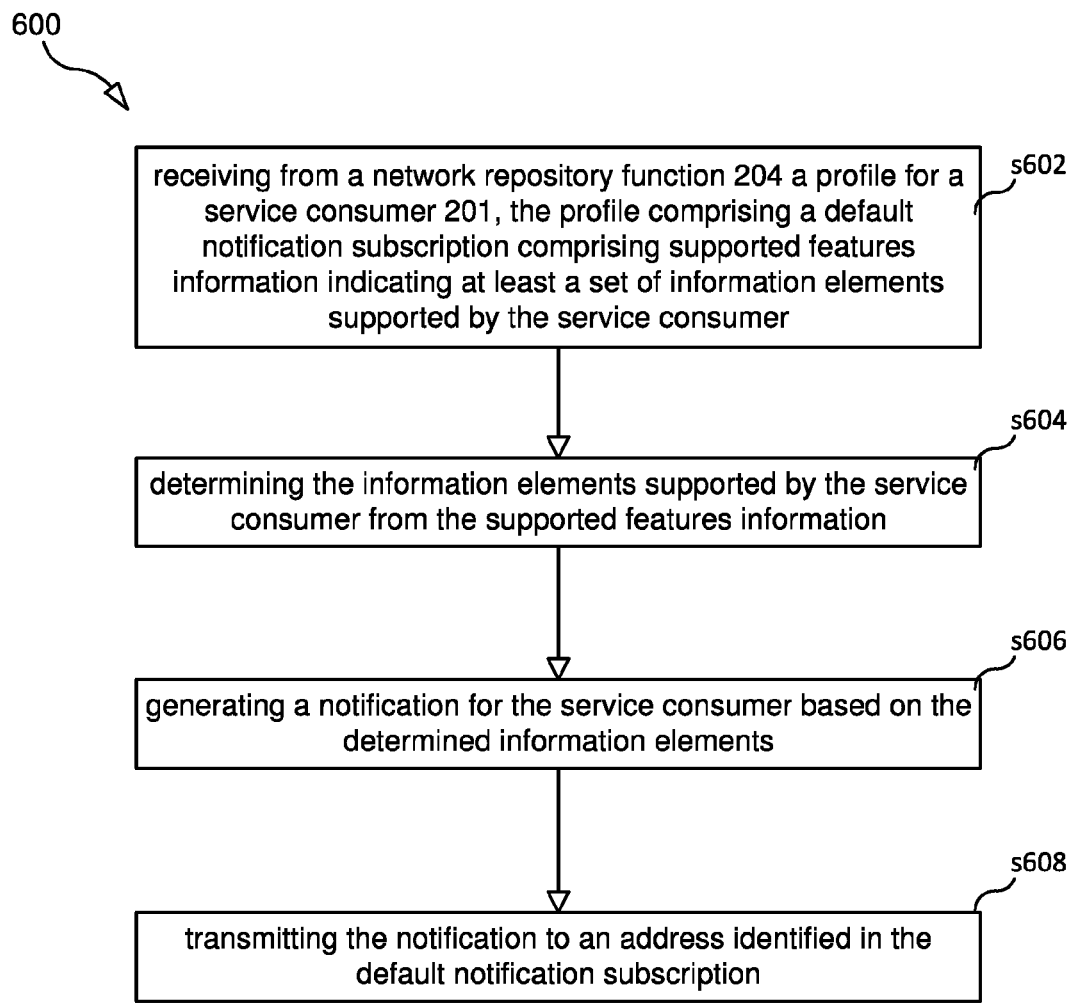
FIG. 6 is a flowchart illustrating a process according to an embodiment.

FIG. 6 is a flowchart illustrating a process 600 according to an embodiment. Process 600 is performed by service producer 202 and may begin in step s602. Step s602 comprises receiving from a network repository function a profile for a service consumer, the profile comprising a default notification subscription comprising supported features information indicating at least a set of information elements supported by the service consumer. Step s604 comprises determining the information elements supported by the service consumer from the supported features information. Step s606 comprises generating a notification for the service consumer based on the determined information elements. Step s608 comprises transmitting the notification to an address identified in the default notification subscription (e.g., an address included in or identified by a Uniform Resource Identifier (URI) identified in the default notification subscription). In some embodiments, generating the notification based on the determined information elements comprises generating the notification such that the notification includes only information elements supported by the service consumer.

Figure 7:
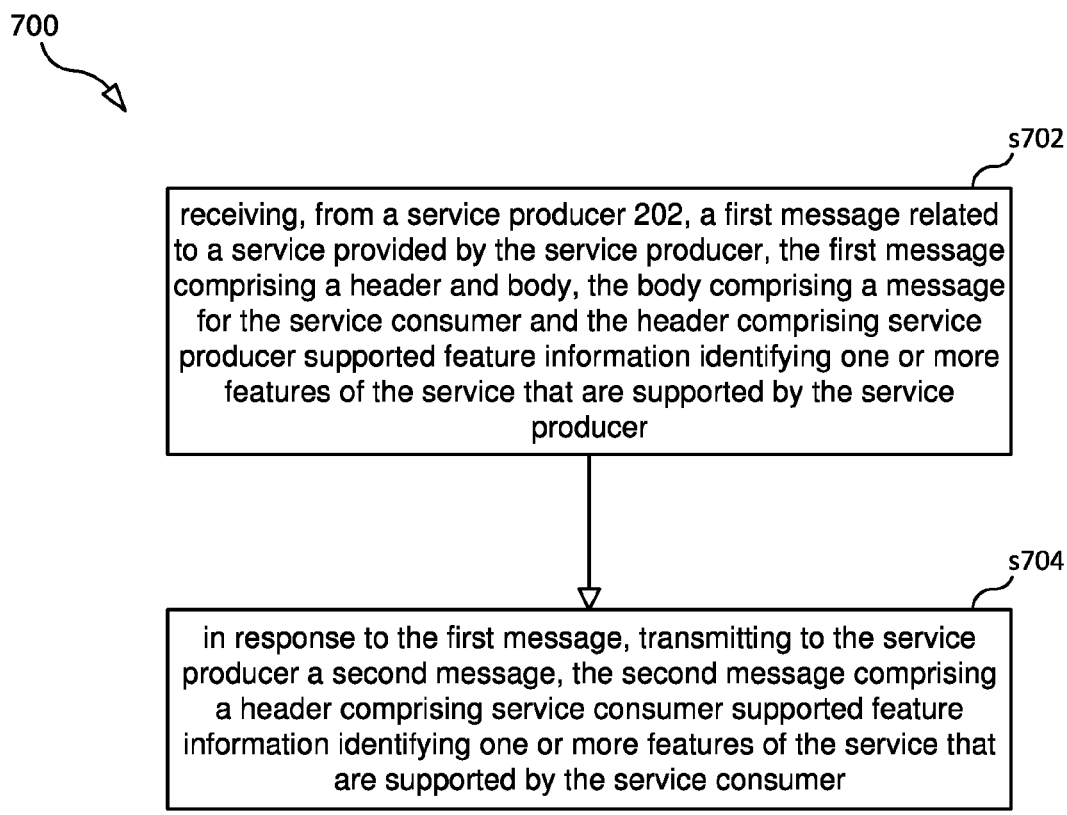
FIG. 7 is a flowchart illustrating a process according to an embodiment.

FIG. 7 is a flowchart illustrating a process 700 according to an embodiment. Process 700 is performed by service consumer 201 and may begin in step s702. Step s702 comprises receiving, from a service producer, a first message (e.g., a first HTTP message) related to a service provided by the service producer. The first message comprises a header and body. The body comprises a message for the service consumer and the header comprises service producer supported feature information identifying one or more features of the service that are supported by the service producer. Step s704 comprises, in response to the first message, transmitting to the service producer a second message (e.g., a second HTTP message). The second message comprises a header comprising service consumer supported feature information identifying one or more features of the service that are supported by the service consumer.

In some embodiments, the first message comprises a notification and the second message is a notification response message. In some embodiments, the service producer is at least an instance of an Access and Mobility Management Function (AMF), and the service is at least a communication service (e.g., Namf_Communication service). In some embodiments, the service consumer is at least an instance of a Location Management Function (LMF) or an Access and Mobility Management Function (AMF). In some embodiments, the service consumer supported feature information is a string containing a bitmask identifying the one or more features of the service that are supported by the service consumer.

Figure 8:
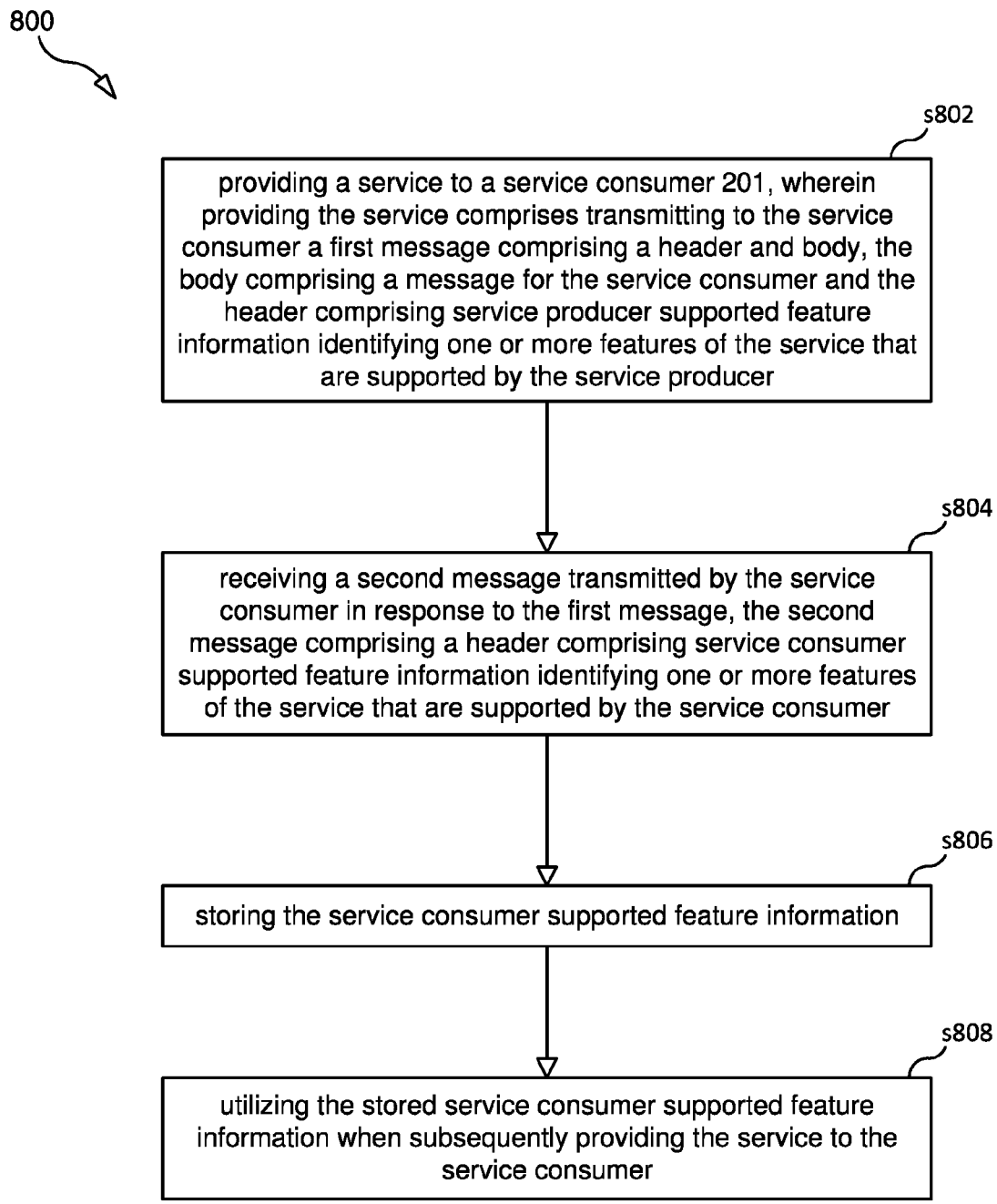
FIG. 8 is a flowchart illustrating a process according to an embodiment.

FIG. 8 is a flowchart illustrating a process 800 according to an embodiment. Process 800 is performed by service producer 202 and may begin in step s802. Step s802 comprises providing a service to a service consumer. Providing the service comprises transmitting to the service consumer a first message (e.g., a HTTP message) comprising a header and body (step s804). The body comprises a message for the service consumer and the header comprises service producer supported feature information identifying one or more features of the service that are supported by the service producer. Step s804 comprises receiving a second message (e.g., a second HTTP message) transmitted by the service consumer in response to the first message. The second message comprises a header comprising service consumer supported feature information identifying one or more features of the service that are supported by the service consumer. Step s806 comprises storing the service consumer supported feature information. Step s808 comprises utilizing the stored service consumer supported feature information when subsequently providing the service to the service consumer.

In some embodiments, the first message comprises a notification and the second message is a notification response message. In some embodiments, the service producer is at least an instance of an Access and Mobility Management Function (AMF), and the service is at least a communication service (e.g., Namf_Communication service). In some embodiments, the service consumer is at least an instance of a Location Management Function (LMF) or an Access and Mobility Management Function (AMF). In some embodiments, the service consumer supported feature information is a string containing a bitmask identifying the one or more features of the service that are supported by the service consumer.

Figure 9:
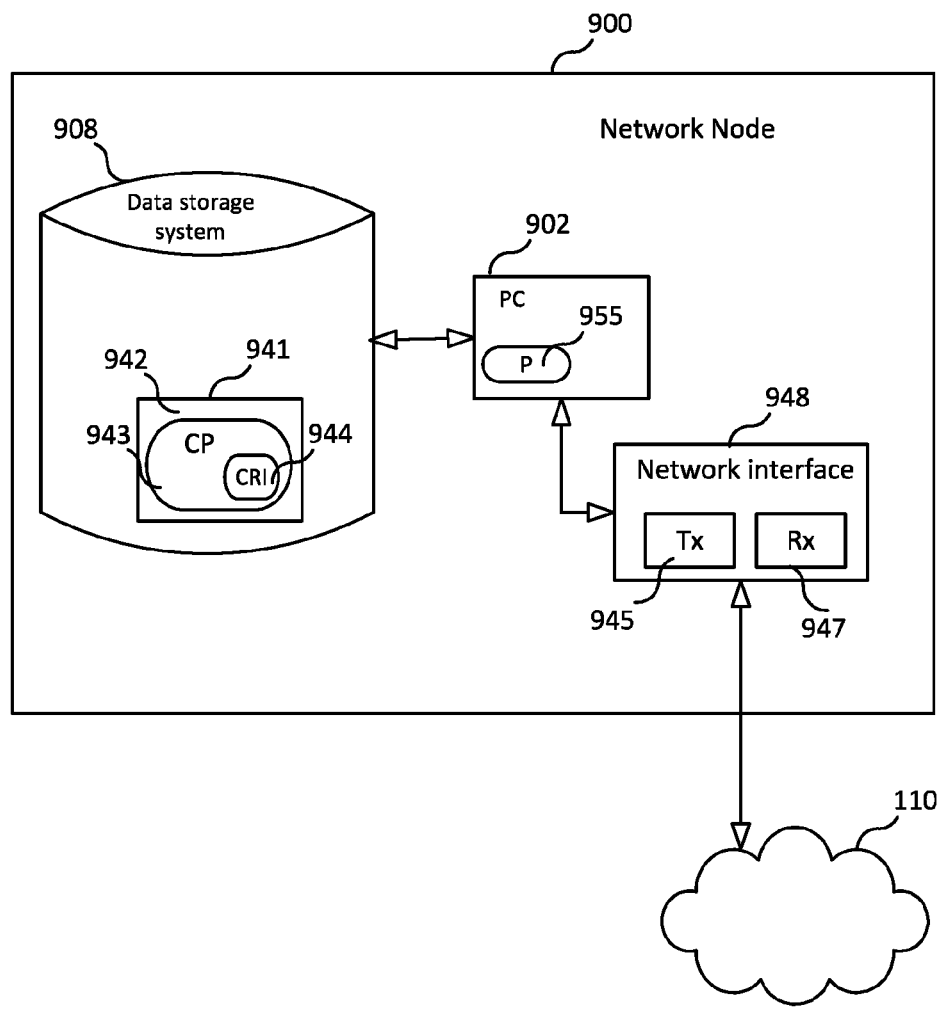
FIG. 9 illustrates a network node according to an embodiment.

FIG. 9 is a block diagram of a network node 900, according to some embodiments, which can be used to implement service consumer 201, service producer 202, and/or NRF 204. For instance, in embodiments where service consumer 201, service producer 202, and/or NRF 204 consists of software, network node 900 may run (or execute a virtual machine that runs) service consumer 201, service producer 202, and/or NRF 204. As shown in FIG. 9, network node 900 may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., network node 900 may be a distributed computing apparatus); a network interface 948 comprising a transmitter (Tx) 945 and a receiver (Rx) 947 for enabling network node 900 to transmit data to and receive data from other machines connected to a network 110 (e.g., an Internet Protocol (IP) network) to which network interface 948 is connected (directly or indirectly) (e.g., network interface 948 may be wirelessly connected to the network 110, in which case network interface 948 is connected to an antenna arrangement); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable storage medium (CRSM) 942 storing a computer program (CP) 943 comprising computer readable instructions (CRI) 944. CRSM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes network node 900 to perform steps described herein (e.g., steps described herein with reference to the flow charts). In other embodiments, network node 900 may be configured to perform steps described herein without the need for code. That is, for example, PC 902 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a service consumer, the method comprising: invoking a management service provided by a network repository function, wherein invoking the management service comprises: generating a management message comprising a profile pertaining to the service consumer; and transmitting to the network repository function the management message comprising the profile, wherein the profile pertaining to the service consumer comprises first default notification subscription information, and the first default notification subscription information comprises: a first notification type identifier identifying a first notification type to which the service consumer subscribes by default, wherein notifications of the first notification type are provided by a service producer that provides a service for providing the notifications, and first feature support information that identifies one or more features the service consumer supports for the service provided by the service producer for providing the notifications.

2. The method of claim 1, wherein
the management message is transmitted for an initial service registration, or
the management message is transmitted for an update of a service registration.

3. The method of claim 1, wherein the service is a communication service provided by an instance of an Access and Mobility Management Function (AMF).

4. The method of claim 1, wherein the service consumer is an instance of a Location Management Function (LMF) or an instance of an Access and Mobility Management Function (AMF).

5. The method of claim 1, wherein the first feature support information is a string containing a bitmask indicating supported features.

6. A method performed by a service producer, the method comprising:
invoking a discovery service for discovering service consumers, wherein invoking the discovery service comprises:
generating a discovery message comprising query parameters; and
transmitting to a network repository function the discovery message comprising the query parameters, wherein the query parameters include:
a notification type identifier identifying a type of notification that is provided by the service producer, and
a consumer supported features parameter that identifies one or more features that are desired to be supported by a service consumer that subscribes to notifications of the identified type by default.

7. The method of claim 6, wherein
the discovery message comprises an indicator indicating that the one or more features identified by the consumer supported features parameter are required to be supported by the service consumer, or
the discovery message comprises an indicator indicating that the one or more features identified by the consumer supported features parameter are preferred to be supported by the service consumer.

8. The method of claim 6, wherein the discovery message is a Hypertext Transfer Protocol (HTTP) GET message comprising the query parameters.

9. The method of claim 6, wherein the service producer comprises an instance of an Access and Mobility Management Function (AMF).

10. The method of claim 6, wherein the service consumer comprises an instance of a Location Management Function (LMF).

11. The method of claim 6, wherein the consumer supported features parameter is a string containing a bitmask identifying the one or more features.

12. A method performed by a network repository function (NRF), the method comprising: receiving a management message, wherein the management message comprises a profile pertaining to a service consumer, the profile comprising a first default notification subscription information that comprises: (i) a first notification type identifier identifying a first notification type to which the service consumer subscribes by default, wherein notifications of the first notification type are provided by a service producer that provides a service for providing the notifications and (ii) first feature support information that identifies one or more features the service consumer supports for the service provided by the service producer for providing the notifications.

13. The method of claim 12, wherein the method further comprises:
the NRF storing the profile in a data repository.

14. The method of claim 13, wherein
the method further comprieses the NRF receiving a discovery message,
the discovery message comprises query parameters and the query parameters include: i) a notification type identifier identifying a type of notification that is provided by the service producer and ii) a consumer supported features parameter that identifies one or more features that are desired to be supported by a service consumer that subscribes to notifications of the identified type by default, and
the method further comprises the NRF determining whether the profile matches the query parameters.

15. The method of claim 14, wherein the NRF transmits a response to the discovery message and the response includes the profile only if the NRF determines that the profile indicates that the service consumer supports the desired features.

16. The method of claim 14, wherein the NRF transmits a response to the discovery message and the response includes the profile even in the event that the NRF determines that the profile indicates that the service consumer does not support the desired features.

17. The method of claim 14, wherein determining whether the profile matches the query parameters comprises determining whether a feature identified by the consumer supported features parameter is also identified by the first feature support information that was included in the first default notification subscription information.

18. A method performed by a service producer, the method comprising:
receiving from a network repository function a profile for a service consumer, the profile comprising a default notification subscription comprising supported features information indicating at least a set of information elements supported by the service consumer;
determining the information elements supported by the service consumer from the supported features information;
generating a notification for the service consumer based on the determined information elements; and
transmitting the notification to an address identified in the default notification subscription.

19. The method of claim 18, wherein generating the notification based on the determined information elements comprises generating the notification such that the notification includes only information elements supported by the service consumer.

20. A method performed by a service consumer, the method comprising:
receiving, from a service producer, a first message related to a service provided by the service producer, the first message comprising a header and body, the body comprising a message for the service consumer and the header comprising service producer supported feature information identifying one or more features of the service that are supported by the service producer; and
in response to the first message, transmitting to the service producer a second message, the second message comprising a header comprising service consumer supported feature information identifying one or more features of the service that are supported by the service consumer.

21. The method of claim 20, wherein the first message comprises a notification and the second message is a notification response message.

22. The method of claim 20, wherein the service producer is at least an instance of an Access and Mobility Management Function (AMF), and the service is at least a communication service.

23. The method of claim 20, wherein the service consumer supported feature information is a string containing a bitmask identifying the one or more features of the service that are supported by the service consumer.

24. A method performed by a service producer, the method comprising:
providing a service to a service consumer, wherein providing the service comprises transmitting to the service consumer a first message comprising a header and body, the body comprising a message for the service consumer and the header comprising service producer supported feature information identifying one or more features of the service that are supported by the service producer; and
receiving a second message transmitted by the service consumer in response to the first message, the second message comprising a header comprising service consumer supported feature information identifying one or more features of the service that are supported by the service consumer;
storing the service consumer supported feature information; and
utilizing the stored service consumer supported feature information when subsequently providing the service to the service consumer.

25. A non-transitory computer readable storage medium storing a computer program comprising instructions which when executed by processing circuitry of a network node causes the network node to perform the method of claim 1.

26. A network node, wherein the network node comprises processing circuitry and a memory containing instructions executable by the processing circuitry, wherein the network node is configured to perform the method of claim 1.

* * * * *